(12) United States Patent
Kang et al.

(10) Patent No.: US 11,236,456 B2
(45) Date of Patent: Feb. 1, 2022

(54) LAUNDRY TREATMENT APPARATUS

(71) Applicant: LG ELECTRONICS INC., Seoul (KR)

(72) Inventors: Hyojeong Kang, Seoul (KR); Hwanchan Ryu, Seoul (KR); Junhee An, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 187 days.

(21) Appl. No.: 16/548,125

(22) Filed: Aug. 22, 2019

(65) Prior Publication Data
US 2020/0063322 A1 Feb. 27, 2020

(30) Foreign Application Priority Data

Aug. 22, 2018 (KR) .................. 10-2018-0098220

(51) Int. Cl.
*D06F 34/28* (2020.01)
*D06F 101/00* (2020.01)
*D06F 25/00* (2006.01)
*D06F 39/14* (2006.01)
*D06F 34/05* (2020.01)
*D06F 34/32* (2020.01)

(52) U.S. Cl.
CPC .............. *D06F 34/28* (2020.02); *D06F 25/00* (2013.01); *D06F 34/05* (2020.02); *D06F 34/32* (2020.02); *D06F 39/14* (2013.01); *D06F 2101/00* (2020.02)

(58) Field of Classification Search
CPC .............................. D06F 34/28; D06F 2101/00
See application file for complete search history.

(56) References Cited

U.S. PATENT DOCUMENTS

| | | | |
|---|---|---|---|
| 2013/0185079 | A1 | 7/2013 | Park et al. |
| 2013/0255327 | A1 | 10/2013 | Park |
| 2014/0156075 | A1 | 6/2014 | Yang et al. |
| 2015/0078565 | A1 | 3/2015 | Tu et al. |
| 2015/0330008 | A1 | 11/2015 | Yang et al. |
| 2015/0345065 | A1 | 12/2015 | Yang et al. |

FOREIGN PATENT DOCUMENTS

| | | |
|---|---|---|
| CN | 107794694 A | 3/2018 |
| CN | 108301166 A | 7/2018 |
| EP | 1 887 443 | 2/2008 |
| EP | 2 644 765 | 10/2013 |
| EP | 2 849 457 | 3/2015 |
| EP | 3 654 331 A1 | 5/2020 |
| JP | 2018-045088 | 3/2018 |

(Continued)

OTHER PUBLICATIONS

European Search Report dated Nov. 8, 2019 issued in EP Application No. 19193089.0.

(Continued)

*Primary Examiner* — Spencer E. Bell
(74) *Attorney, Agent, or Firm* — KED & Associates LLP

(57) ABSTRACT

Disclosed is a laundry treatment apparatus including a voice recognition unit coupled to any one of a cabinet and a door to receive voice of a user and convert the voice into an input signal for driving a laundry receiving portion, and a shielding portion coupled to at least one of the cabinet or the door to prevent vibrations or sound waves generated from the laundry receiving portion from being transmitted to the voice recognition unit.

16 Claims, 8 Drawing Sheets

(56) References Cited

FOREIGN PATENT DOCUMENTS

| KR | 10-2004-0050765 | 6/2004 |
| KR | 10-1709483 | 2/2017 |
| WO | WO 2014/088333 | 6/2014 |

OTHER PUBLICATIONS

International Search Report and Written Opinion dated Dec. 24, 2019 issued in PCT/KR2019/010663.
European Office Action dated Mar. 24, 2021 issued in Application 19193089.0.
Chinese Office Action (and English Translation) dated Apr. 28, 2021 issued in Application 201910778140.4.

(a)

(b)

(a)

(b)

(a)

(b)

LAUNDRY TREATMENT APPARATUS

CROSS-REFERENCE TO RELATED APPLICATION

This application claims priority under 35 U.S.C. § 119 to Korean Application No. 10-2018-0098220 filed on Aug. 22, 2018, whose entire disclosure is hereby incorporated by reference.

BACKGROUND

1. Field

The present invention relates to a laundry treatment apparatus.

2. Background

In general, a laundry treatment apparatus refers to an apparatus capable of washing or drying laundry, or washing and drying the laundry. Herein, the laundry treatment apparatus may perform only a washing or drying function or may perform both washing and drying functions. Recently, a washing machine capable of performing a refresh function that removes creases, odor, static electricity, etc. by means of a steam supplier has been introduced.

A conventional laundry treatment apparatus has been equipped with a control panel disposed on the front surface or top surface of a cabinet to receive manipulation commands from the user. The control panel has been provided with a plurality of input portions for operating the laundry treatment apparatus so that the laundry treatment apparatus may perform a washing or drying course.

The input portion may be provided with a rotary switch, a button, or a touch panel that receives any one of a course or an option performed by the laundry treatment apparatus from the user. The control panel may transmit a command for executing the course or option input to the input portion to a controller to operate the laundry treatment apparatus according to setting of the course or the option.

Recently, a laundry treatment apparatus including a voice recognition unit installed in the input portion has emerged so that the voice recognition unit recognizes voice of the user to replace physical input, such as input through the rotary switch, button, or touch panel, with voice.

As such, the user may control the laundry treatment apparatus without physically touching the laundry treatment apparatus, so that user convenience and space utilization can be maximized.

However, such a voice recognition unit has very sensitively responded to vibrations because the voice recognition unit has been configured to receive vibrations generated from sound waves. Therefore, if vibrations occur in the case in which a drum of the laundry treatment apparatus rotates or water supply or drainage is performed in the laundry treatment apparatus, there has been a problem that the voice recognition unit cannot accurately recognize the voice of the user.

Thus, when the conventional laundry treatment apparatus is in operation, a recognition level of the voice recognition unit has been reduced.

In addition, even when vibrations generated from the exterior are transmitted to the conventional laundry treatment apparatus, the voice recognition unit has had difficulty in correctly recognizing the voice of the user.

Therefore, whenever the user controls the laundry treatment apparatus through voice, the user should have inconveniently confirmed whether the voice recognition unit has correctly recognized the voice of the user.

BRIEF DESCRIPTION OF THE DRAWINGS

The embodiments will be described in detail with reference to the following drawings in which like reference numerals refer to like elements wherein.

DETAILED DESCRIPTION

Figure 1:
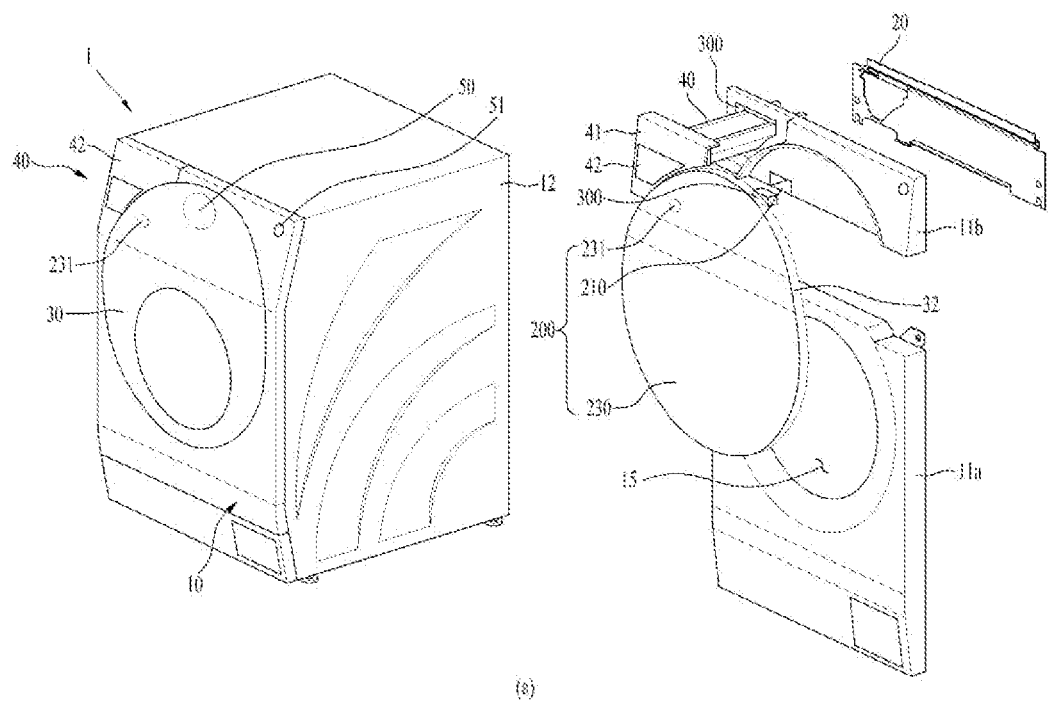
FIG. 1 illustrates an external appearance of a laundry treatment apparatus and a voice recognition unit according to the present invention.
Figure 1:
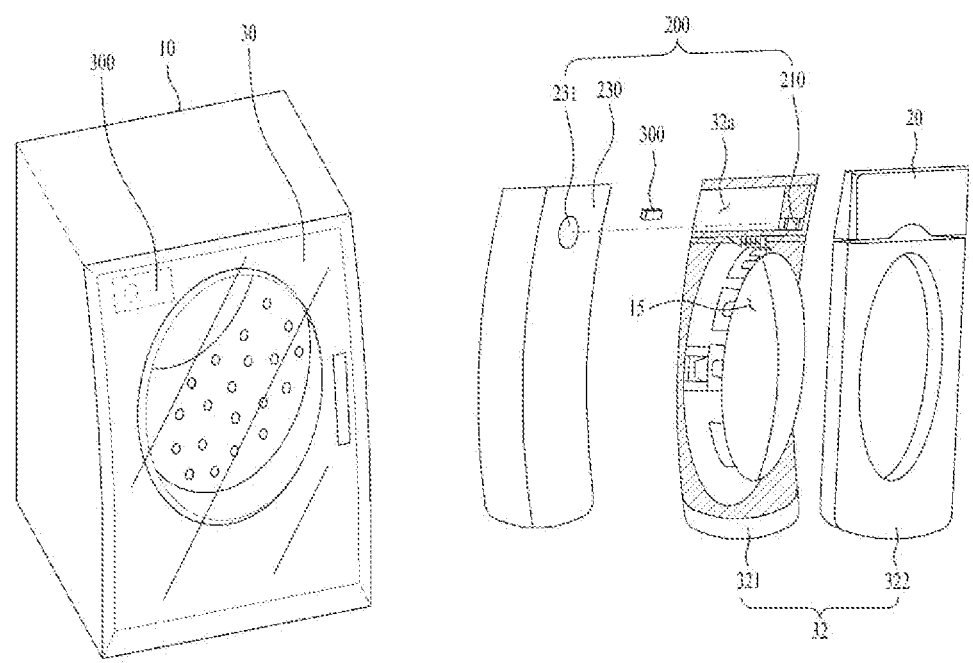

Reference will now be made in detail to the exemplary embodiments of the present invention, examples of which are illustrated in the accompanying drawings. The configuration or control method of an apparatus disclosed herein is illustrated only to explain embodiments of the present invention, and shall not be construed as limiting the scope of the present invention. In addition, the same reference numerals will be used throughout the specification to refer to the same or like parts.

FIG. 1 illustrates an external appearance of a laundry treatment apparatus and a voice recognition unit according to an embodiment of the present invention.

A laundry treatment apparatus 1 of the present invention may include a cabinet 10 forming an external appearance of the laundry treatment apparatus 1 and including an opening 15 into which laundry is introduced and a door 30 coupled to the cabinet 10 to open and close the opening 15. The cabinet 10 may be provided with a laundry receiving portion to be described later and the laundry receiving portion may be configured to perform at least one of washing or drying of laundry inside the cabinet 10.

The cabinet 10 may further include a front panel 11 which forms the front surface of the laundry treatment apparatus 1 and a side panel 12 which forms the side surface of the laundry treatment apparatus 1. The opening 15 may be configured in a manner of penetrating the front panel 11 of the laundry treatment apparatus 1. It is apparent that this construction is purely one embodiment of the present invention and does not exclude the opening 15 provided on the top side of the laundry treatment apparatus 1.

The laundry treatment apparatus 1 of the present invention may further include an input portion 50 for receiving a command for enabling the laundry treatment apparatus 1 to perform at least one of washing or drying and a control panel 20 including a controller for receiving the command input through the input portion 50 and transmitting the command for enabling the laundry treatment apparatus 1 to perform washing or drying.

The input portion 50 may be provided with at least one of buttons, a rotary knob, and a touch panel so that the user may physically touch the input portion 50 and may be configured to receive commands corresponding to various courses and options that the laundry treatment apparatus 1 may perform.

In addition to the input portion 50, the laundry treatment apparatus 10 of the present invention may include a voice recognition unit 300 configured to receive voice of the user and match a course and an option corresponding to the voice. The voice recognition unit 300 may be implemented as a microphone electrically connected to the control panel 20. The voice recognition unit 300 may be implemented as an independent printed circuit board (PCB) panel on which the microphone is installed to recognize voice of the user even though power is not supplied to the controller 20 disposed in the control panel 20.

The voice recognition unit 300 may be desirably configured to be exposed to the exterior of the laundry treatment apparatus 1 as much as possible. This is because it is difficult to accurately receive voice of the user when the voice recognition unit 300 is disposed within the cabinet 10, Generally, the user generates voice in front of the laundry treatment apparatus 1 or on the side of the laundry treatment apparatus 1. In this case, the voice recognition unit 300 is desirably provided at the front side of the laundry treatment apparatus 1 to maximally collect and receive the voice. Therefore, the voice recognition unit 300 may be provided on any one of the door 30 or the front panel 11 of the cabinet 10.

The voice recognition unit 300 is very sensitive to vibrations because the voice recognition unit 300 is configured to receive minute vibrations such as sound waves and recognize a voice signal. In this case, if vibrations generated when the laundry treatment apparatus 1 is operated are originally transmitted to the voice recognition unit 300 or when noise generated from the exterior of the laundry treatment apparatus 1 reaches the voice recognition unit 300, the voice recognition unit 300 may respond to the vibrations or noise and thus there is a high possibility that the voice recognition unit 300 fails to correctly distinguish or recognize the voice of the user.

Therefore, the laundry treatment apparatus 1 of the present invention may further include a shielding portion 200 configured to prevent other vibrations or sound waves except for the voice of the user from being transmitted to the voice recognition unit 300.

The shielding portion 200 may include an installation unit 210 coupled to any one of the door and the cabinet on which the voice recognition unit is installed to accommodate at least a part of the voice recognition unit 300, a cover 230 coupled to the front side of the installation unit 210 to shield the voice recognition unit 300, and a through-hole 231 configured to penetrate the cover 230 to transmit the voice to the voice recognition unit 300.

As such, the voice of the user may be transmitted through the through-hole 231 to the voice recognition unit 300, and the cover 230 and the installation unit 210 may prevent or attenuate external vibrations or vibrations generated from the laundry treatment apparatus 1 from arriving at the voice recognition unit 300. As a result, the accuracy and reliability of recognizing the voice of the user by the voice recognition unit 300 may be greatly improved.

FIG. 1(a) illustrates an embodiment in which the voice recognition unit 300 is disposed on the front panel 11 and FIG. 1(b) illustrates an embodiment in which the voice recognition unit 300 is disposed on the door 30.

Referring to FIG. 1(a), the door 30 is configured to open and close the opening 15. The door 30 may shield a part of the front panel 11 and the input portion 50 may be disposed on the door 30.

The door 30 may include a door frame 32 configured to be detachably attachable to the opening 15. The installation unit 210 in which the voice recognition unit 300 is installed may be disposed on the front side of the front panel 11.

The installation unit 210 may be recessed from the front panel 11 to be shaped in a case into which at least a part of the voice recognition unit 300 is accommodated.

The cover 230 is coupled to the front side of the door frame 32 to shield the opening 15. The cover 230 may be disposed at the front side of the installation unit 210 to shield the voice recognition unit 300 and may be provided with the through-hole 231 to communicate with the installation unit 210.

The voice of the user may pass through the through-hole 231 and then reach the voice recognition unit 300. The installation unit 210 may prevent or attenuate vibrations generated from the laundry treatment apparatus from being transmitted to the voice recognition unit 300 and the cover 230 may prevent or attenuate vibrations generated from the exterior from being transmitted to the voice recognition unit 300. Although the voice recognition unit 300 is disposed on the front panel 11, the shielding portion 200 of the laundry treatment apparatus 1 of the present invention may be disposed on the door 30 and also on the front panel 11 so that various vibrations and sound waves are shielded from being transmitted to the voice recognition unit 300.

Referring to FIG. 1(b), the door 30 is configured to open and close the opening 15 and to shield most of the front panel 11. In other words, the door 30 may be configured to form the front surface of the cabinet 10. The input portion 50 may be provided on the top surface of the cabinet 10.

The door 30 may include the door frame 32 which includes a rear frame 322 configured to be contactable to the opening 15 and a front frame 321 disposed at the front side of the rear frame 322. The installation unit 210 in which the voice recognition unit 300 is installed may be disposed on the front side of the front frame 321.

The installation unit 210 may be provided on the front frame 321 in the shape of a case into which at least a part of the voice recognition unit 300 is accommodated or in the shape of a hole configured to penetrate the front frame 321.

The cover 230 is coupled to the front side of the front frame 321 to shield the opening 15. The cover 230 is disposed at the front portion of the installation unit 210 to shield the voice recognition unit 300 and may be provided with the through-hole 231 to communicate with the installation unit 210.

The voice of the user may pass through the through-hole 231 and then reach the voice recognition unit 300. The installation unit 210 may prevent or attenuate vibrations generated from the laundry treatment apparatus from being transmitted to the voice recognition unit 300 and the cover 230 may prevent or attenuate vibrations generated from the exterior from being transmitted to the voice recognition unit 300. Although the voice recognition unit 300 is disposed on the front panel 11, the shielding portion 200 of the laundry treatment apparatus 1 of the present invention may be disposed on the door 30 and also on the front panel 11 so that various vibrations and sound waves are shielded from being transmitted to the voice recognition unit 300.

The upper side of the rear frame 322 may be coupled to the control panel 20 and the control panel 20 may be configured to be electrically connected to the voice recognition unit 300.

Thus, the control panel 20 is exposed to the exterior when the door 30 opens the opening 15 so that it is easy to repair and install the control panel 20.

Figure 2:
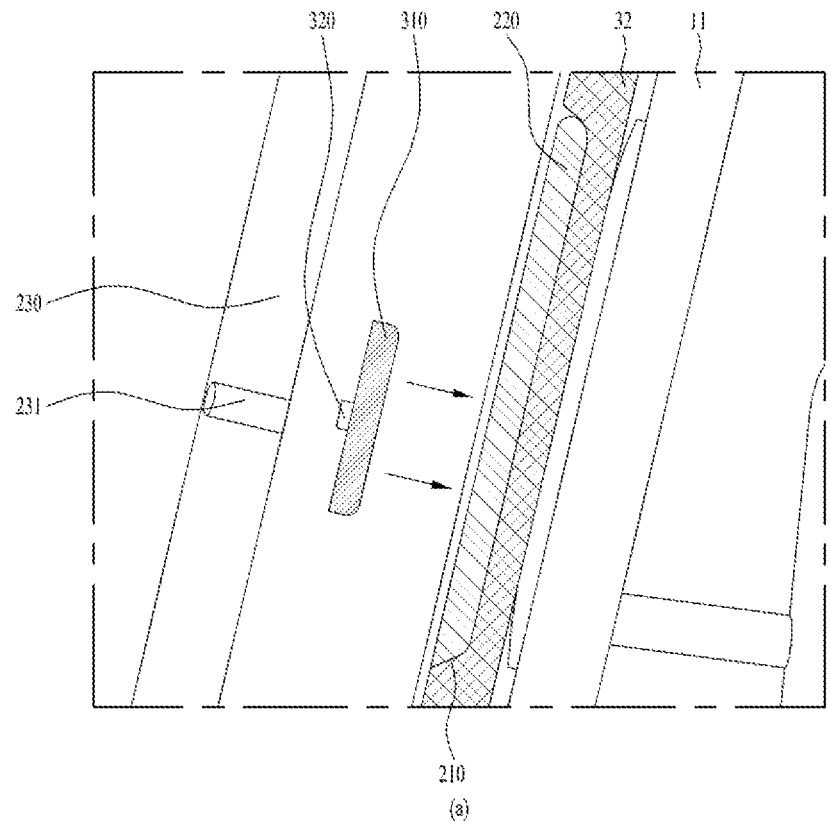
FIG. 2 illustrates a structure in which a voice recognition unit and a shielding portion are coupled according to the present invention.
Figure 2:
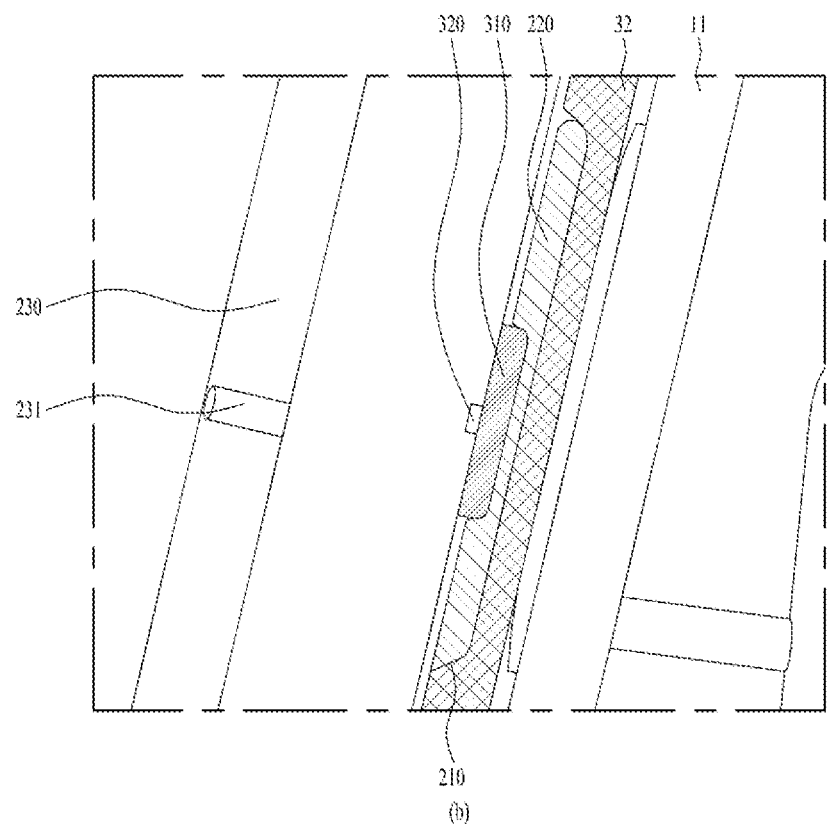

FIG. 2 illustrates a structure in which the voice recognition unit 300 and shielding portion 200 are coupled.

Even if the voice recognition unit 300 does not directly contact the door 30 or the cabinet 10 by configuring the installation unit 210, vibrations transmitted to the installation unit 210 may be sufficiently transmitted to the voice recognition unit 300.

Referring to FIG. 2(a), the shielding portion 200 of the present invention may further include a shock absorber 220 disposed between the installation unit 210 and the voice recognition unit 300 to shield sound waves or vibrations generated from the laundry receiving portion from being transmitted to the voice recognition unit 300.

The shock absorber 220 may be coupled to or accommodated in the installation unit 210 to absorb or attenuate vibrations transmitted to the installation unit 210. Specifically, the shock absorber 220 may be formed of a material having a shape which is changed when external force or vibrations are transmitted but is restored to an original form when external force or vibrations are removed. For example, the shock absorber 220 may be made of a material such as sponge or rubber.

Referring to FIG. 2(b), the voice recognition unit 300 is configured such that the rear surface thereof closely contacts the shock absorber 220. When the voice recognition unit 300 is inserted into the installation unit 210, the voice recognition unit 300 may be configured to press the shock absorber 220.

The cover 230 may be coupled to the front side of the installation unit 210 to shield the installation unit 210, thereby fixing the voice recognition unit 300.

Figure 3:
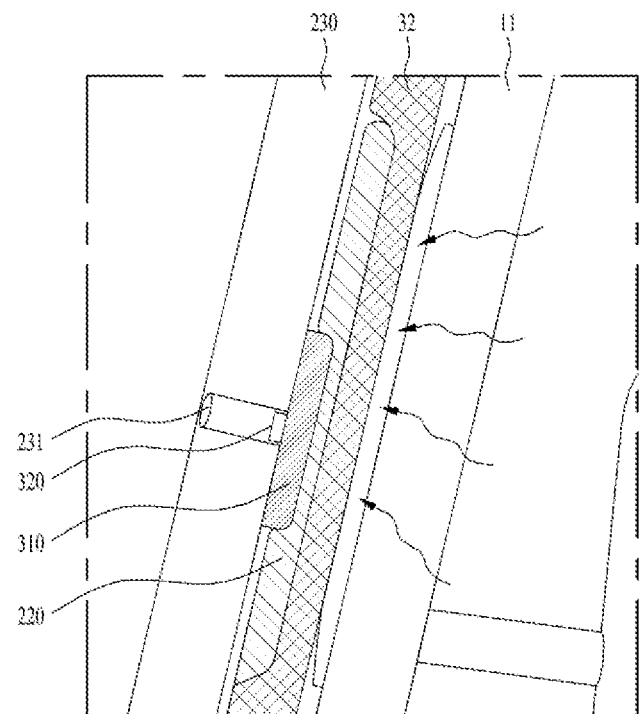
FIG. 3 illustrates the function of the shielding portion according to the present invention.
Figure 3:
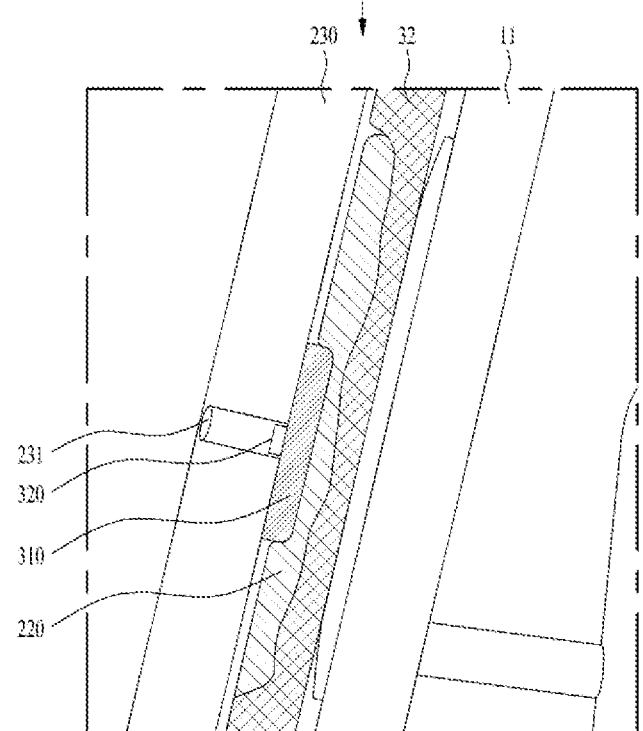

FIG. 3 illustrates the function of the shielding portion 200 according to the present invention.

Referring to FIG. 3(a), the voice recognition unit 300 may be accommodated in the installation unit 210 and may closely contact the shock absorber 220. The voice recognition unit 300 may be shielded by the cover 230 and may be fixed to the laundry treatment apparatus 1.

The voice recognition unit 300 may include a microphone 320 which receives voice and a PCB panel 310 which is coupled to the microphone 320 to convert the voice into the input signal. Therefore, the cover 230 may be configured to closely contact the front side of the PCB panel 310 and the through-hole 231 may be configured to penetrate the cover 230 at a position corresponding to the microphone 320.

As such, even if the cover 230 is configured to closely contact the PCB panel 310, the microphone 320 is exposed to the exterior through the through-hole 231 to receive the voice of the user. In addition, the installation unit 210 may prevent vibrations or sound waves transmitted from the interior of the laundry treatment apparatus 1 from leaking to the exterior of the laundry treatment apparatus 1, thereby preventing unnecessary vibrations or sound waves from being transmitted to the microphone 320.

Referring to FIG. 3(b), vibrations, external force, and shock caused by water supply, drainage, or rotation of a drum which will be described later generated from the interior of the laundry treatment apparatus 1 may be transmitted to the shock absorber 220. In this case, the surface shape of the shock absorber 220 may be changed according to vibrations, external force, and shock. The shock absorber 220 attenuates or absorbs all vibrations or external force, thereby substantially preventing unnecessary vibrations or external force from being transmitted to the voice recognition unit 300.

Figure 4:
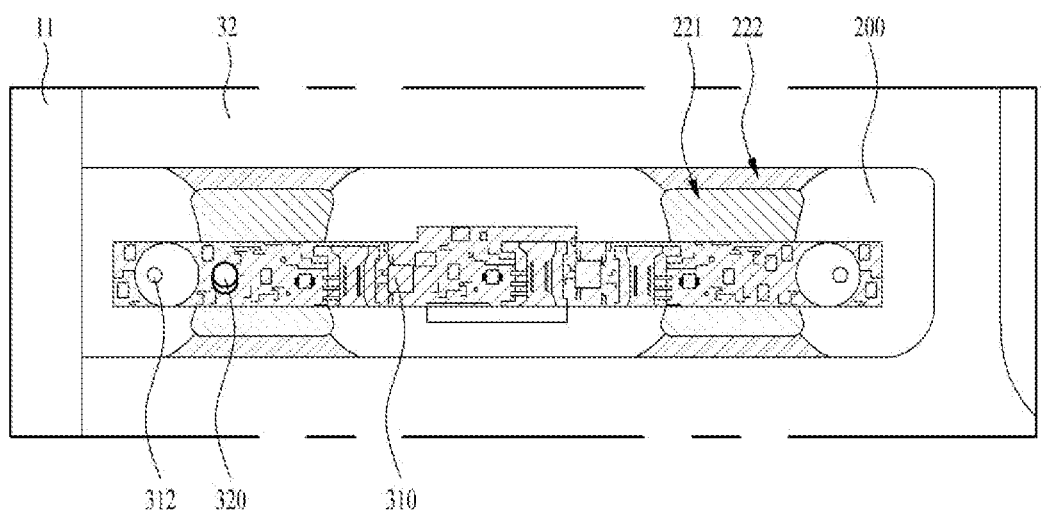
FIG. 4 illustrates an embodiment of the shielding portion according to the present invention.

FIG. 4 illustrates an embodiment of the shielding portion according to the present invention.

Referring to FIG. 4, the shock absorber 220 may include a shock absorbing damper 221 coupled to the installation unit 210d and configured to be pressed from the rear surface of the voice recognition unit 300.

One or more shock absorbing dampers 221 may closely contact the rear surface of the PCB panel 310 to absorb vibrations or external force transmitted to the installation unit 210, thereby preventing the vibrations or external force from being transmitted to the microphone 320.

The shock absorber 220 may further include a subsidiary damper 222 coupled to the installation unit 210 to attenuate vibrations transmitted to the installation unit 210.

The subsidiary damper 222 may be coupled to the installation unit 210 but one side thereof is configured to be separated from the installation unit 210 so that the subsidiary damper 222 vibrates differently from the installation unit 210. That is, if the installation unit 210 vibrates, the subsidiary damper 222 vibrates by inertia so that the subsidiary damper 222 may vibrate with a period and width different from a period and width of vibrations transmitted to the installation unit 210. As such, the subsidiary damper 222 may primarily attenuate the vibrations transmitted to the installation unit 210. Then, the shock absorbing damper 221 coupled to the subsidiary damper 220 absorbs only the primarily attenuated vibrations, thereby absorbing all of the vibrations transmitted to the shock absorbing damper 221.

Accordingly, the shielding portion 200 may effectively cancel or attenuate vibrations transmitted from the laundry receiving portion.

A plurality of subsidiary dampers 222 may be provided. The subsidiary dampers may be symmetrically disposed at the rear surface of the PCB panel. The shock absorbing dampers 221 may be configured to be coupled to the respective subsidiary dampers 222.

Figure 5:
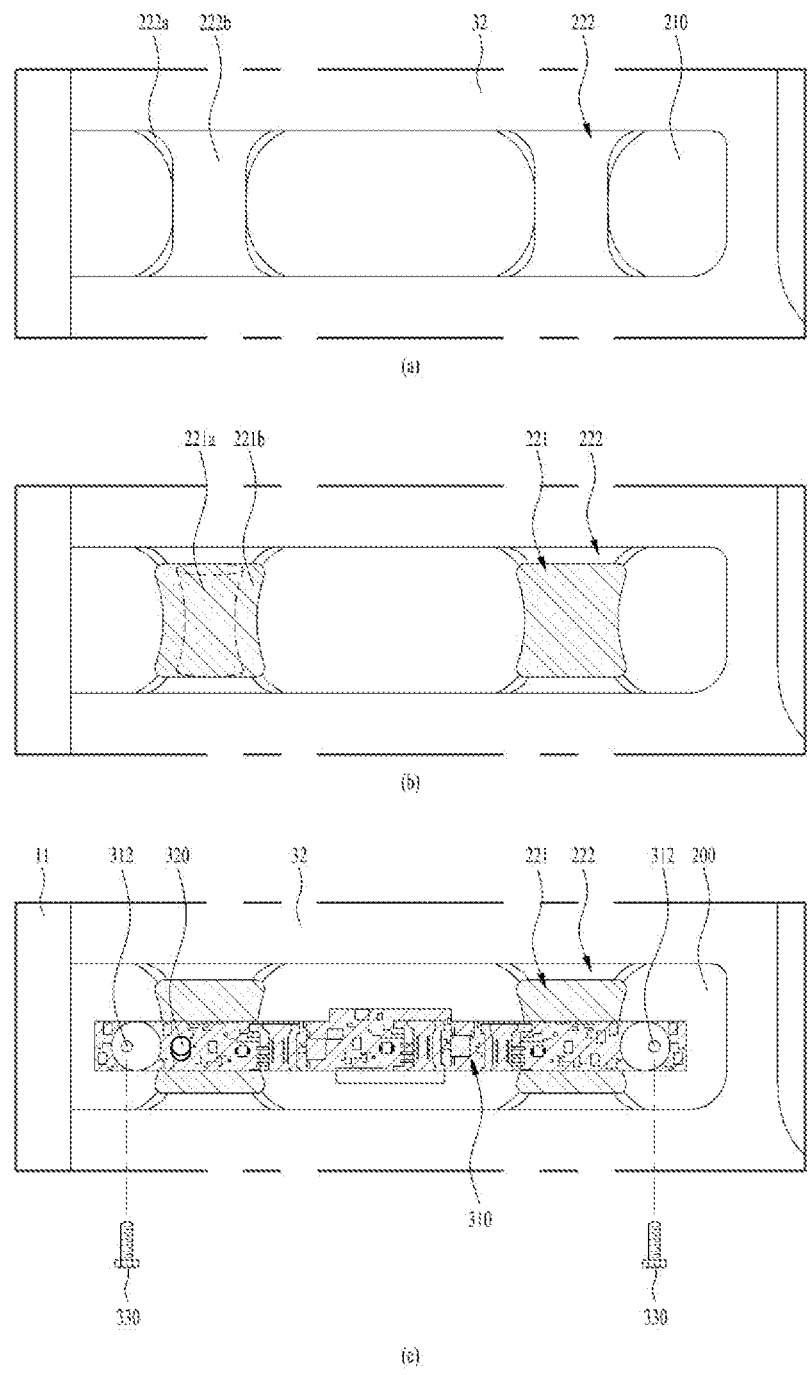
FIG. 5 illustrates an assembly process of the shielding portion of FIG. 4.

FIG. 5 illustrates an assembly process of the shielding portion of FIG. 4.

Referring to FIG. 5(a), the installation unit 210 may be configured to be coupled to the subsidiary damper 222. It is apparent that the subsidiary damper 222 may be provided to be unified with the installation unit 210.

Specifically, the subsidiary damper 222 may include connection portions 222a coupled to either one side and the other side of the installation unit 210 and fastening portions 222b formed to connect the connection portions 222a to each other and configured to be separated from the bottom surface of the installation unit 210.

The connection portions 222a may be provided with a material different from the installation unit 210. Specifically, the connection portions 222a may be provided with an elastic material which is expansive and contractive in length.

The subsidiary damper 222 may be thinner towards a center thereof from the connection portion 222a. As such, after vibrations transmitted to the subsidiary damper 222 are absorbed or attenuated in the connection portion 222a, the vibrations may be transmitted to the fastening portion 222b.

Referring to FIG. 5(b), the shock absorbing dampers 221 may be respectively coupled to the subsidiary dampers 222. The shock absorbing damper 221 may include a damper body 221a for accommodating the fastening portion 222b and an fastener hole 221b configured to be penetrated by the fastening portion 222b at both ends of the damper body 221a to cause the damper body and the fastening portion to be coupled. The damper body 221a may be provided with one side which is cut so that the damper body 221 may be coupled to the subsidiary damper 222 through the fastener hole 221b while accommodating an outer circumference of the subsidiary damper 222.

The damper body 221a may be provided in a cylindrical shape. The damper body 221a may be provided with a material to change the shape thereof if external force or vibrations are provided and restore the shape thereof if external force or vibrations are removed. For example, the damper body 221a may be made of a material such as sponge.

Referring to FIG. 5(c), the voice recognition unit 300 may be coupled to the damper body 221a while pressing the damper body 221a at the outer side of the damper body 221a.

In this case, both ends of the PCB panel 310 may further include a joint hole 312 to which a fastening member 330 such as a bolt may be fastened. The fastening member 330 may be fixed to the installation unit 210 by penetrating the joint hole 312, thereby fixing the PCB panel 310 to the installation unit 210.

In this case, the fastening member 330 may further closely contact the PCB panel 310 with the damper body 221a. Then, a side surface of the PCB panel 310 as well as the rear surface of the PCB panel 310 closely contact the damper body 221a, thereby preventing vibrations generated in various directions from being transmitted to the PCB panel 310.

Figure 6:
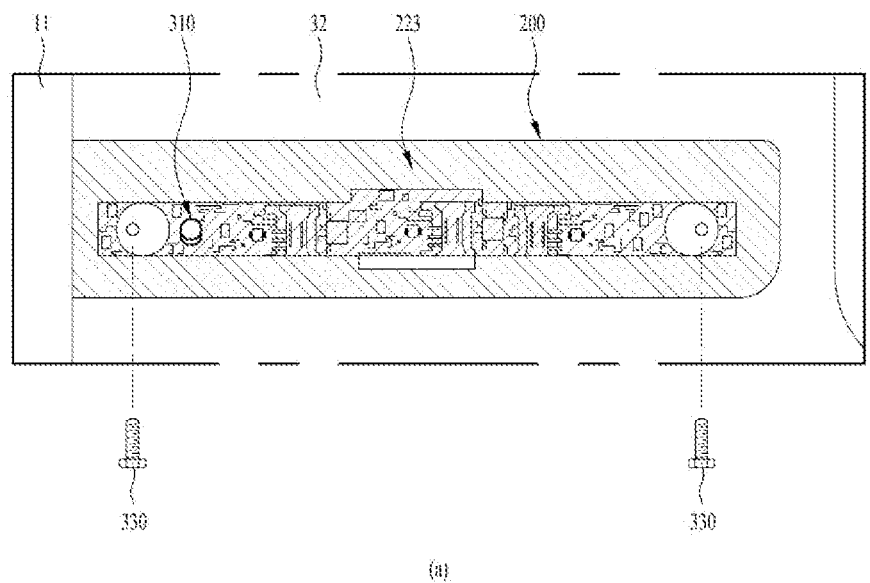
FIG. 6 illustrates another embodiment of the shielding portion according to the present invention.
Figure 6:
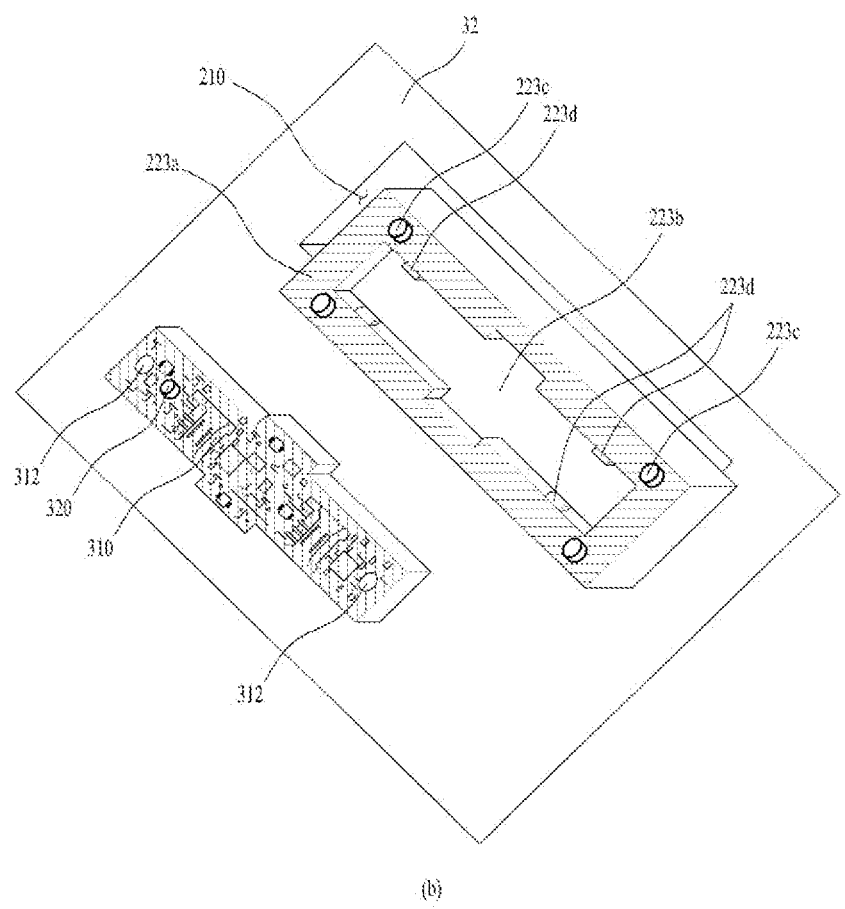

FIG. 6 illustrates another embodiment of the shielding portion 200.

Referring to FIG. 6(a), the voice recognition unit 300 may be configured to be completely accommodated in the shielding portion 200. That is, the shielding portion 200 may be coupled to be completely accommodated in the installation unit 210 and may include a sealing damper 223 for accommodating all of an outer circumference of the voice recognition unit 300.

As such, vibrations of various directions transmitted to the installation unit 210 are prevented from being transmitted to the voice recognition unit 300.

Referring to FIG. 6(b), the sealing damper 223 may include a sealing body 223a coupled to the installation unit 210 and an accommodation groove 223b which corresponds to the shape and thickness of the voice recognition unit 300 and is disposed in the sealing body 223 to completely accommodate the voice recognition unit 300.

In addition, the sealing damper 223 may further include a separation prevention protrusion 223d which protrudes towards an inner surface of the accommodation groove 223b from one side of the accommodation groove 223b to fix the location of the voice recognition unit 300.

As such, the separation prevention protrusion 223d may prevent the location of the voice recognition unit 300 in the accommodation groove 223b from being changed or deviated due to vibrations transmitted to the installation unit 210.

Specifically, the accommodation groove 223b may be configured with deeper depth than the thickness of the PCB panel 310 and the separation prevention protrusion 223d may be configured such that thickness between the lower surface thereof and the bottom surface of the accommodation groove 223b corresponds to the thickness of the PCB panel 310 and is thinner than the thickness of the PCB panel 310.

The sealing damper 233 may further include a cover supporter 223c configured to protrude from the sealing body 233a to support the cover 230.

A plurality of supporters 223c may be provided and may be disposed at every edge of the sealing body 233a. Thus, even if the cover 230 is formed to closely contact the voice recognition unit 300, vibrations transmitted to the cover 230 may be prevented from being transmitted to the voice recognition unit 300.

Although FIG. 6 shows that the cover supporters 223c are disposed at the sealing body 233c, the cover supporters 223c may be disposed in all of the above-described embodiments.

That is, the shock absorber 220 of the laundry treatment apparatus of the present invention may further include the cover supporters 233c which contact the cover 230 and support the cover 230.

Figure 7:
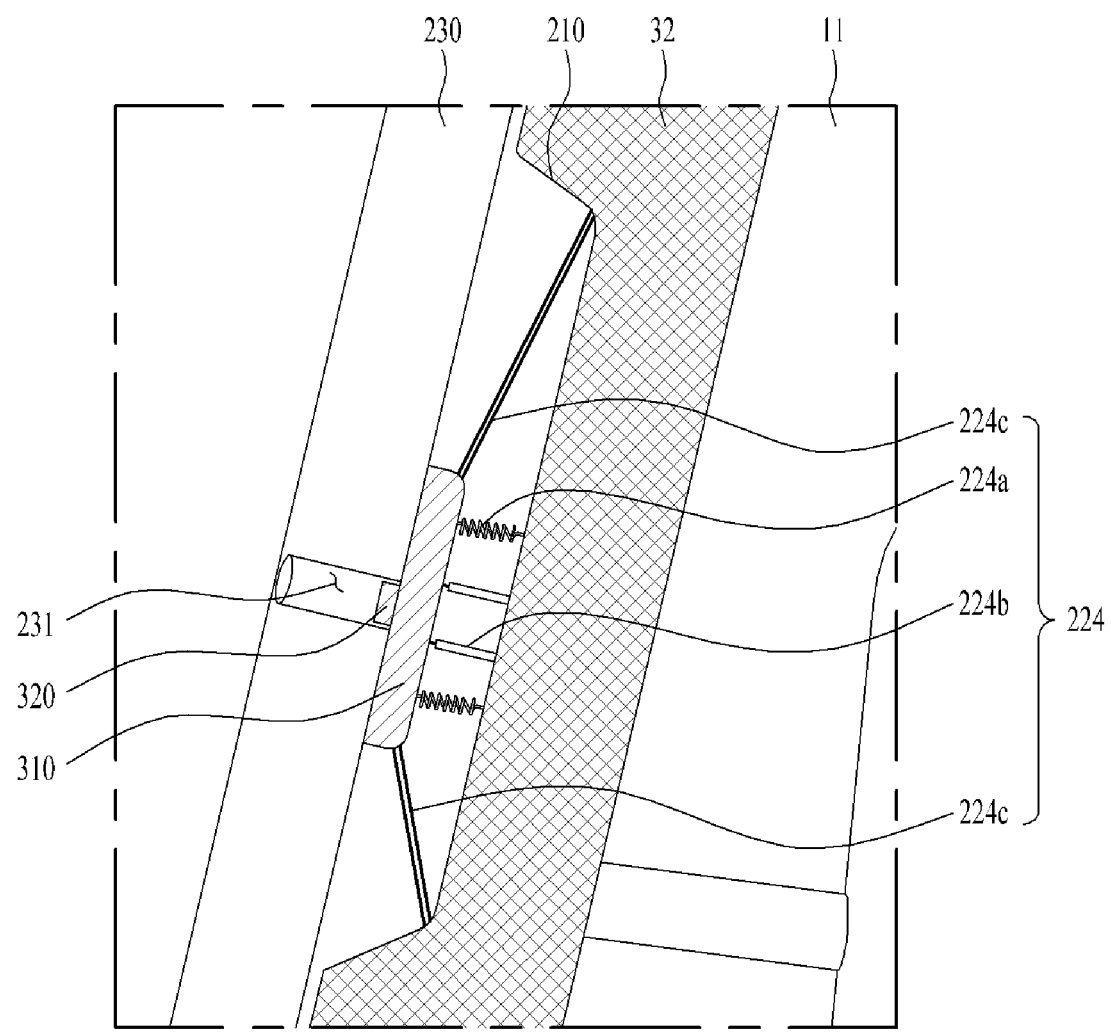
FIG. 7 illustrates still another embodiment of the shielding portion according to the present invention.

FIG. 7 illustrates still another embodiment of the shielding portion 230 according to the present invention.

The shock absorber 220 may further include an interval maintainer 224 configured to maintain a separated state between the voice recognition unit 300 and the installation unit 210. The interval maintainer 224 may be configured to separate the installation unit 210 from the rear surface of the voice recognition unit 300 but to connect the voice recognition unit 300 to the installation unit 210.

Specifically, the interval maintainer 224 may include any one of a connection spring 224a coupled to the rear surface of the voice recognition unit 300 and to the installation unit 210 and a connection damper 224b coupled to the rear surface of the voice recognition unit 300 and to the installation unit 210 to attenuate vibrations.

The interval maintainer 224 may further include a fixing line 224c coupled to both ends of the voice recognition unit 300 and to the installation unit 210 to provide tension to the voice recognition unit 300.

As such, the connection spring 224a may be configured to be compressed to provide force for pushing the PCB panel 310 to the exterior and the fixing line 224C is configured to provide tension for cancelling force pushed by the connection spring 224a, so that the PCB panel 310 may be maintained at a correct location.

The connection spring 224a and the connection damper 224b separate the PCB panel 310 from the installation unit 210 to shield the PCB panel 310 from directly contacting vibrations transmitted to the installation unit 210. The fixing line 224C may provide tension so that the PCB panel 310 may be restored to a right location even if vibrations are transmitted to the PCB panel 310.

The connection damper 224b may immediately attenuate vibrations provided to the PCB panel 310 to cancel vibrations or external force applied to the PCB panel 310.

Figure 8:
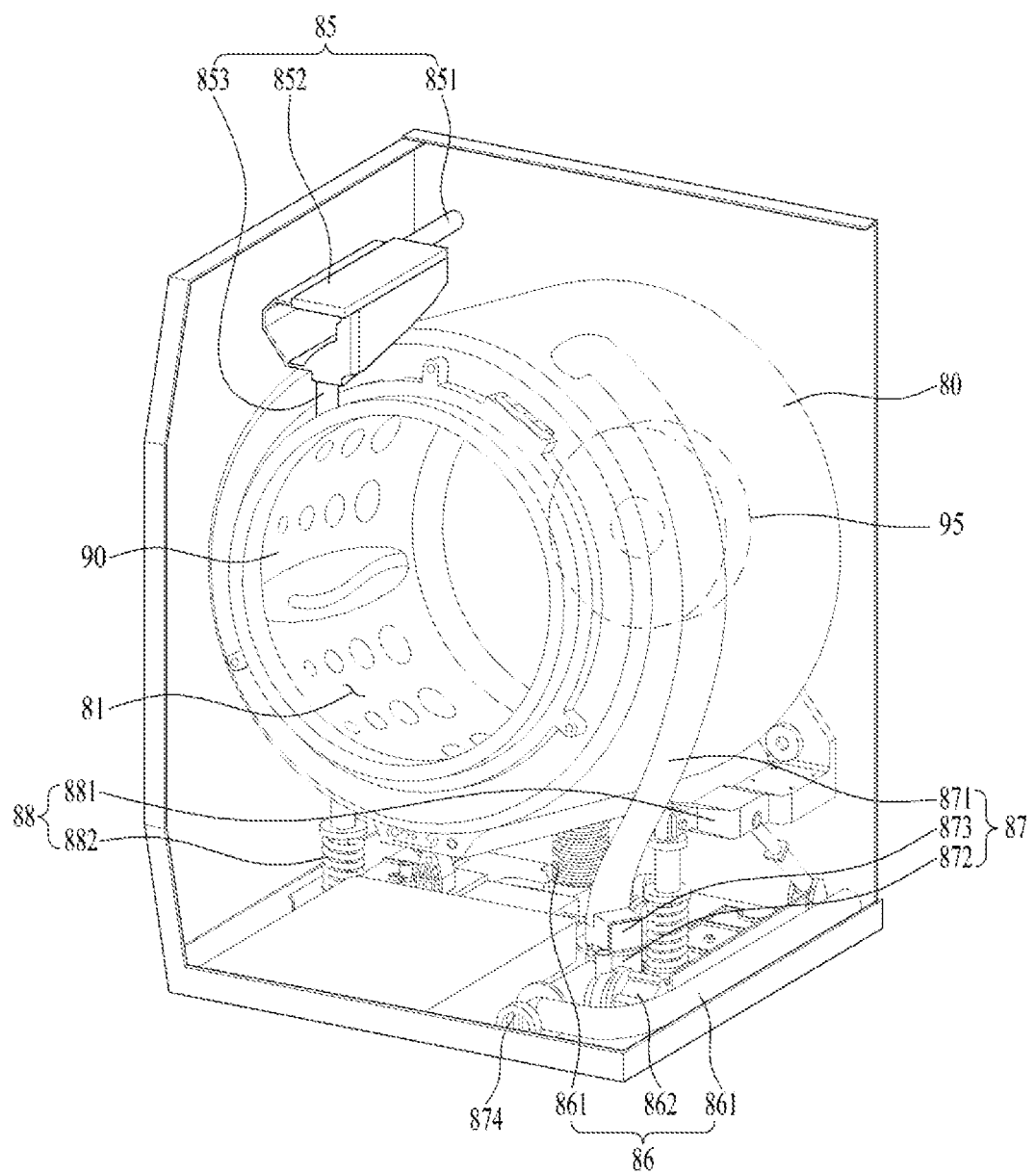
FIG. 8 illustrates an internal structure of a laundry treatment apparatus according to the present invention.

FIG. 8 illustrates an internal structure in which the laundry treatment apparatus of the present invention is configured as a washing apparatus.

Referring to FIG. 8, a laundry receiving portion of the laundry treatment apparatus according to an embodiment of the present invention may include a tub 80 including space disposed insider the cabinet 10 to store water and including an inlet portion 81 communicating with the opening 15, a drum 90 rotatably installed in the tub 80 to receive laundry, and a driving unit 95 disposed at the rear surface of the tub 80 to rotate the drum 90.

The laundry treatment apparatus according to an embodiment of the present invention may further include a water supply portion 85 for supplying water to the tub 80, a drainage portion 86 for draining water of the tub 80 to the exterior of the cabinet 10, and a circulation portion 87 for circulating water of the tub 80.

The water supply portion 85 may include a water supply pipe 851 connected to an external water supply source to supply water to the tub 80, a box housing 852 for communicating with one end of the water supply pipe 851 and accommodating a detergent box 40, and a supply pipe 853 for connecting the box housing 852 to one side of the tub 80 to supply at least one of water or detergent to the tub 80.

The box housing 852 may accommodate the detergent box 40 as a space for mixing detergent accommodated in the detergent box 40 with water supplied from the water supply pipe 851.

The drainage portion 86 may include a drain pipe 861 for draining water of the tub 80 and a drain pump 862 for providing power to drain water injected into the drain pipe 861 to the exterior of the cabinet 10.

The circulation portion 87 may include a circulation pipe 871 for guiding water injected into the drain pipe 861 again to the tub 80 and a circulation pump 872 for communicating with the circulation pipe 871 and providing power flowing into the circulation pipe 871.

A 3-way valve 873 may be provided at a portion to which the circulation pipe 871 and the drain pipe 861 are connected and a filter 874 may be configured to filter a foreign material from water drained from the tub 80.

The driving unit 95 may include a stator fixed to the rear surface of the tub 80 to generate a rotational magnetic field, a rotor rotated by the stator, and a rotation axis for connecting the rotor to the rear surface of the drum 90.

However, unlike FIG. 8, the driving unit 95 may include a motor, a drive pulley rotated by the motor, a driven pulley for rotating the rotation axis connected to the rear surface of the drum 90, and a belt.

The tub 80 may be fixed to the cabinet by a supporting structure 88.

The supporting structure 88 may include a suspension bracket 881 coupled to the rear surface of the tub 80 and to the driving unit 95 and a plurality of dampers 882 connecting the suspension bracket 881 to the bottom surface of the cabinet 10.

Although not illustrated in FIG. 8, a plurality of springs for supporting the tub 80 may be further provided.

The supporting structure 88 may have any structure if the structure supports the tub 80 in the interior of the cabinet 10 to attenuate vibrations.

When water is supplied to the water supply portion 85, when the drainage portion 86 or the circulation portion 85 is operated, or when the driving unit 95 is driven, the laundry treatment apparatus 1 may generate vibrations.

In this case, the above-described shielding portion 200 may prevent the vibrations of the laundry treatment apparatus 1 from being transmitted to the voice recognition unit 300, thereby greatly improving the reliability of the voice recognition unit 300.

As is apparent from the foregoing description, the present invention provides the laundry treatment apparatus including the voice recognition unit capable of improving reliability by accurately receiving the voice of the user.

The present invention provides the laundry treatment apparatus capable of performing a control command intended by the user by accurately recognizing the voice of the user even when the laundry treatment apparatus is in operation.

The present invention provides the laundry treatment apparatus capable of accurately recognizing the voice of the user even when external force is generated from the exterior of the laundry treatment apparatus.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

Accordingly, the present invention is directed to a laundry treatment apparatus that substantially obviates one or more problems due to limitations and disadvantages of the related art.

An object of the present invention is to provide a laundry treatment apparatus including a voice recognition unit for receiving control commands through the voice of the user, capable of preventing or attenuating vibrations or external force generated from the interior of the laundry treatment apparatus from being transmitted to the voice recognition unit.

Another object of the present invention is to provide a laundry treatment apparatus capable of preventing or attenuating vibrations generated from the exterior of the laundry treatment apparatus from being transmitted to a voice recognition unit.

Another object of the present invention is to provide a laundry treatment apparatus capable of improving reliability by accurately recognizing the voice of the user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a laundry treatment apparatus includes a cabinet forming an external appearance of the laundry treatment apparatus and including an opening into which laundry is introduced, a laundry receiving portion disposed inside the cabinet to perform any one of washing or drying of the laundry, a door coupled to the cabinet to open and close the opening, a voice recognition unit coupled to any one of the cabinet and the door to receive voice of a user and convert the voice into an input signal for driving the laundry receiving portion, and a shielding portion coupled to at least one of the cabinet or the door to prevent vibrations or sound waves generated from the laundry receiving portion or transmitted to the cabinet from being transmitted to the voice recognition unit.

The shielding portion may include an installation unit coupled to any one of the door and the cabinet to accommodate the voice recognition unit, a cover coupled to the front side of the installation unit to shield the voice recognition unit, and a through-hole configured to penetrate the cover to transmit the voice to the voice recognition unit.

The voice recognition unit may include a microphone configured to receive the voice and a printed circuit board (PCB) panel coupled to the microphone to covert the voice into the input signal. The cover may be configured to closely contact the front side of the PCB panel. The through-hole may be configured to penetrate the cover at a location corresponding to the microphone.

The shielding portion may include an installation unit coupled to the cabinet or the door to accommodate at least a part of the voice recognition unit, and a shock absorber disposed between the installation unit and the voice recognition unit to prevent the sound waves or vibrations from being transmitted to the voice recognition unit.

The shock absorber may include a shock absorbing damper coupled to the installation unit and configured to be pressed from the rear surface of the voice recognition unit.

The shock absorber may further include a subsidiary damper coupled to the installation unit to attenuate the vibrations, and a shock absorbing damper coupled to the subsidiary damper to support the rear surface of the voice recognition unit.

The subsidiary damper may include connection portions coupled to one side and the other side of the installation unit, and an fastening portion configured to connect the plural connection portions to each other and to be separated from the installation unit. The shock absorbing damper may include a damper body configured to accommodate the fastening portion, and a fastener hole configured to be penetrated by the fastening portion at both ends of the damper body to cause the damper body and the fastening portion to be coupled.

The shock absorbing damper may be formed of a material to change the shape of the shock absorbing damper if external force or vibrations are provided and restore the shape of the shock absorbing damper if the external force or vibrations are removed. The shock absorber may include a sealing damper coupled to the installation unit to accommodate the voice recognition unit.

The sealing damper may include a sealing body configured to be accommodated in the installation unit, and an accommodation groove disposed in the sealing body to completely accommodate the voice recognition unit, the accommodation groove corresponding to the shape and thickness of the voice recognition unit. The sealing damper may further include a separation prevention protrusion protruding towards an inner surface of the accommodation groove from one side of the accommodation groove to fix the location of the voice recognition unit.

The sealing damper may be formed of a material to change the shape of the sealing damper if external force is applied and restore the shape of the sealing damper if the external force is removed.

The shock absorber may further include an interval maintainer configured to maintain a separated state between the voice recognition unit and the installation unit The interval maintainer may include at least any one of a connection spring coupled to the rear surface of the voice recognition unit and to the installation unit, or a connection damper coupled to the rear surface of the voice recognition unit and to the installation unit to attenuate vibrations The interval maintainer may further include a fixing line coupled to both ends of the voice recognition unit and to the installation unit to provide tension to the voice recognition unit.

It is to be understood that both the foregoing general description and the following detailed description of the present invention are exemplary and explanatory and are intended to provide further explanation of the invention as claimed.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A laundry treatment apparatus comprising:
    a cabinet forming an external appearance of the laundry treatment apparatus and including an opening into which laundry is introduced;
    a laundry receiving portion disposed inside the cabinet to perform washing or drying of the laundry;
    a door coupled to the cabinet to open and close the opening;
    a voice recognition portion coupled to one of the cabinet and the door to receive voice of a user and convert the voice into an input signal for driving the laundry receiving portion; and
    a shielding portion coupled to at least one of the cabinet or the door to prevent vibrations or sound waves generated from the laundry receiving portion or transmitted to the cabinet from being transmitted to the voice recognition portion,
    wherein the shielding portion includes:
        an installation portion coupled to the cabinet or the door to accommodate at least a part of the voice recognition portion; and
        a shock absorber disposed between the installation portion and the voice recognition portion to prevent the sound waves or the vibrations from being transmitted to the voice recognition portion,
    wherein the shock absorber includes a sealing damper coupled to the installation portion to accommodate the voice recognition portion,
    wherein the sealing damper includes:
        a sealing body configured to be accommodated in the installation portion; and
        an accommodation groove disposed at the sealing body to accommodate the voice recognition portion, the accommodation groove corresponding to shape and thickness of the voice recognition portion.

2. The laundry treatment apparatus of claim 1, wherein the shielding portion includes:
    the installation portion coupled to one of the door and the cabinet to accommodate the voice recognition portion;
    a cover coupled to a front side of the installation portion to shield the voice recognition portion; and
    a through-hole configured to penetrate the cover to transmit the voice to the voice recognition portion.

3. The laundry treatment apparatus of claim 2,
    wherein the voice recognition portion includes a microphone configured to receive the voice and a printed circuit board (PCB) panel coupled to the microphone to covert the voice into the input signal,
    wherein the cover is configured to contact a front side of the PCB panel, and
    wherein the through-hole is configured to be aligned with the microphone.

4. The laundry treatment apparatus of claim 1, wherein the shock absorber includes a shock absorbing damper coupled to the installation portion and configured to be pressed on a rear surface of the voice recognition portion.

5. The laundry treatment apparatus of claim 4, wherein the shock absorbing damper is formed of a material to change a shape of the shock absorbing damper when external force or vibrations are provided and to restore the shape of the shock absorbing damper when the external force or vibrations are no longer provided.

6. The laundry treatment apparatus of claim 1, wherein the shock absorber further includes:
    a subsidiary damper coupled to the installation portion to attenuate the vibrations, and
    a shock absorbing damper coupled to the subsidiary damper to support a rear surface of the voice recognition portion.

7. The laundry treatment apparatus of claim 6,
    wherein the subsidiary damper includes:
        a plurality of connection portions coupled to an inner surface of the installation portion to face each other; and
        a fastening portion configured to connect the plurality of connection portions to each other and to be separated from the installation portion, and
    wherein the shock absorbing damper includes:
        a damper body configured to accommodate the fastening portion; and
        a fastener hole configured to be penetrated by the fastening portion at both ends of the damper body so that the damper body is to be coupled to the fastening portion.

8. The laundry treatment apparatus of claim 1, wherein the sealing damper further includes a separation prevention protrusion protruding towards an inner surface of the accommodation groove from one side of the accommodation groove to attach the voice recognition portion.

9. The laundry treatment apparatus of claim 1, wherein the sealing damper is formed of a material to change shape of the sealing damper when external force is applied and to restore the shape of the scaling damper when the external force is no longer applied.

10. The laundry treatment apparatus of claim 1, wherein the shock absorber includes an interval maintainer configured to maintain a separated state between the voice recognition portion and the installation portion.

11. The laundry treatment apparatus of claim 10, wherein the interval maintainer includes a connection spring coupled to a rear surface of the voice recognition portion and to the installation portion.

12. The laundry treatment apparatus of claim 11, wherein the interval maintainer further includes a fixing line coupled to both ends of the voice recognition portion and to the installation portion to provide tension to the voice recognition portion.

13. The laundry treatment apparatus of claim 10, wherein the interval maintainer includes a connection damper coupled to a rear surface of the voice recognition portion and to the installation portion to attenuate vibrations.

14. A laundry treatment apparatus comprising:
a cabinet including an opening;
a laundry receiving device disposed inside the cabinet to perform washing or drying;
a door to open and close the opening;
an audio device to receive external audio and to provide an input signal for driving the laundry receiving device based on the external audio; and
a shielding device to couple to at least one of the cabinet or the door to block internal sound from the laundry receiving portion or transmitted to the cabinet from being provided to the audio device,
wherein the shielding device includes:
  an installation device to couple to the cabinet or the door to accommodate at least a part of the audio device; and
  a shock absorber disposed between the installation device and the audio device to block vibration or sound waves from being provided to the audio device,
  wherein the shock absorber includes a sealing damper coupled to the installation device to accommodate the audio device,
  wherein the sealing damper includes:
    a sealing body configured to be accommodated in the installation device; and
    an accommodation groove disposed at the sealing body to accommodate the audio device, the accommodation groove corresponding to shape and thickness of the audio device.

15. The laundry treatment apparatus of claim 14, wherein the shielding device includes:
a cover at a front of the instillation device to shield the audio device; and
a through-hole configured to pass through the cover to allow the external audio to be provided to the audio device.

16. The laundry treatment apparatus of claim 15,
wherein the audio device includes a microphone configured to receive the external audio and a printed circuit board (PCB) panel to convert the audio into the input signal,
wherein the through-hole is configured to be aligned with the microphone.

* * * * *